Aug. 27, 1940.  D. A. MEEKER ET AL  2,212,883
FOOD HANDLING DEVICE
Filed Aug. 13, 1937
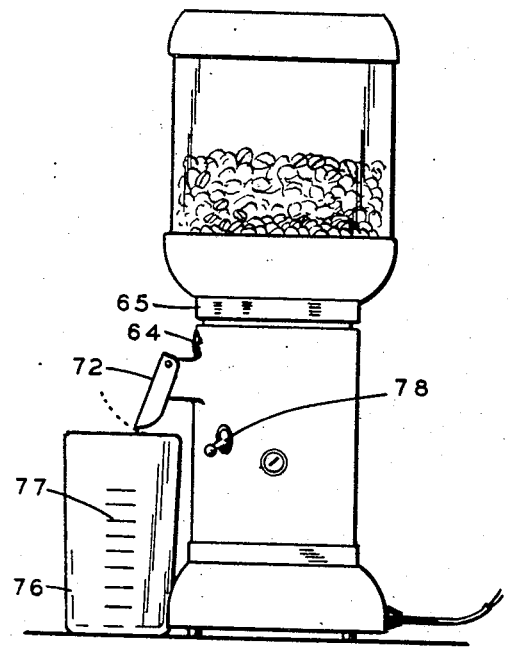
Fig. 1
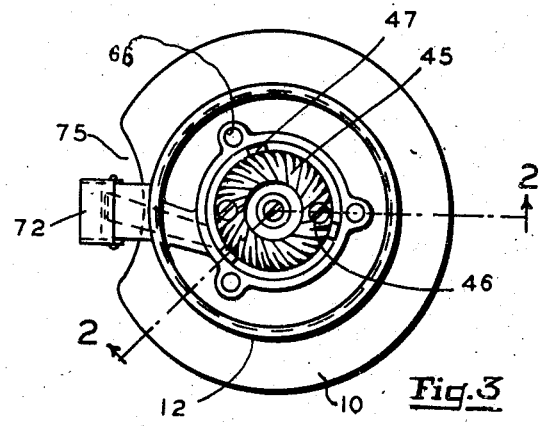
Fig. 3
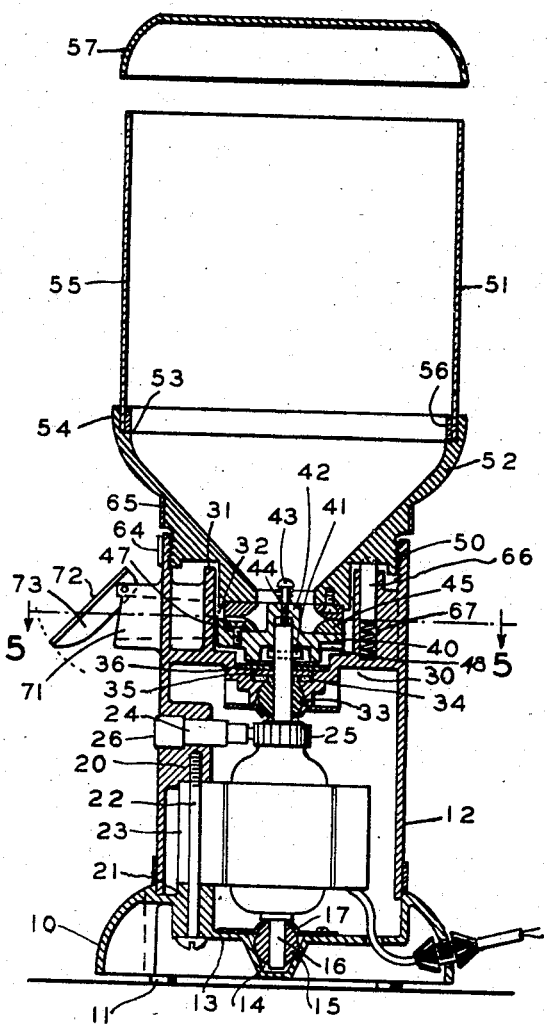
Fig. 2
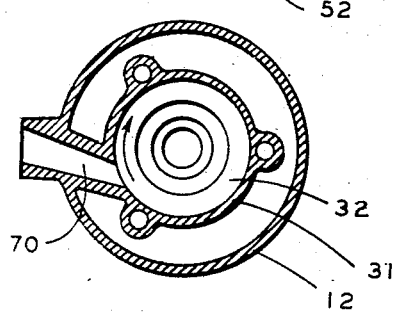
Fig. 4
Fig. 5
INVENTOR
David A. Meeker and
F. Douglass Houser
BY
Maréchal & Noé
ATTORNEYS Patented Aug. 27, 1940

2,212,883

UNITED STATES PATENT OFFICE 2,212,883

FOOD HANDLING DEVICE

David A. Meeker and Franklin Douglass Houser, Troy, Ohio, assignors to The Hobart Manufacturing Company, Troy, Ohio, a corporation of Ohio Application August 13, 1937, Serial No. 158,972

12 Claims. (Cl. 83—18)

This invention relates to grinding mills and in particular to coffee mills and the like.

It is the principal object of the invention to provide a simple, inexpensive, easily portable and highly satisfactory coffee mill adapted for household or domestic use.

It is a further object to provide a small, light-weight and compact coffee mill for domestic use which grinds as much coffee as desired for each coffee making operation in a rapid and effective manner and to a desired and uniform grade of fineness.

It is a further object to provide such a coffee mill in which a substantial quantity of coffee is stored in bean form, and which is adapted to grind the desired quantity for each coffee making operation, and to discharge a homogeneous intermixture of ground bean and chaff.

Other objects and advantages will be apparent from the following description, the accompanying drawing, and the appended claims.

In the drawing—

Fig. 1 is a view in side elevation showing a coffee mill constructed in accordance with the present invention;

Fig. 2 is a vertical sectional view through the mill on the line 2—2 of Fig. 3;

Fig. 3 is a top plan view with the storage hopper removed, and showing the rotary grinding burr;

Fig. 4 is a plan view looking upwardly into the removable storage hopper;

Fig. 5 is a horizontal sectional view taken on the line 5—5 of Fig. 2.

Referring to the drawing which discloses a preferred embodiment of the invention, there is shown a casing comprising a base portion 10 carrying a series of resilient feet 11 for supporting the mill in slightly raised position above a supporting surface. The casing also includes a substantially cylindrical and upstanding part 12 which serves as a housing for the motor and operating parts, received in telescoping relation within the base portion. A web 13 is integrally formed with the base portion 10, and is provided centrally with a recess 14 adapted to receive a bearing 15 for the lower end of the motor shaft 16. This bearing is preferably formed of such construction that it will support the thrust of the motor shaft, and when once assembled will not require inspection or additional lubrication. It is formed preferably from a composition material such as a graphite impregnated bronze, and is retained in position in the recess 14 by resilient members 17 fastened to web 13.

The casing portion 12 provides for receiving the motor, and is formed with an annular part 20, which is spaced from and cooperates with a corresponding portion 21 formed in the base portion 10, for receiving the stator portion of the motor. The two parts of the housing are separable from each other, to provide for the assembly of the motor, and in assembled position bolts 22 are passed through the shoulders 20, 21, and also through the stator part 23 of the motor to form a rigid and compact assembly. Thus the casing itself forms the motor frame, and no additional motor frame or bearings therefore are utilized.

In order to provide a simple and inexpensive device which will have the desired operating characteristics and remain light-weight and readily portable by the housewife, a motor is utilized which can be conveniently mounted in the restricted space within the casing, and which will develop the necessary power to provide a proper rate of grind. Very satisfactory results have been secured utilizing a so called "universal" type of motor, having a brush and commutator construction, and adapted to operate at a relatively high rate of speed. With a motor of this construction, satisfactory operating results are secured in the grinding operation, and the motor itself is small, light-weight, and inexpensive. As shown, an aperture is provided in the casing 12 through which extends the brush assembly 24 in operative engagement with the commutator 25 this brush assembly being shown as moved into the plane of the section in Fig. 2 to show the construction thereof. This construction provides for readily removing the outer cap 26 of the brush assembly, to provide for removal and cleaning of the brush and commutator when necessary.

The casing 12 is formed integrally with an inwardly projecting web 30 which is provided with a series of annular recesses, and with an upwardly extending annular flange 31 defining a burr chamber 32. The web 30 at its lower central portion is provided with an upper bearing member 33 for the upper end of the motor shaft 16, this bearing preferably being of a construction similar to that described for the lower bearing, such that after initial assembly, no further attention nor lubrication is required. A felt oiling washer 34 is positioned in the annular recess immediately above member 33, and being saturated with oil at the time of assembly of the device, provides sufficient lubrication for the bearing throughout the life of the device. Above the washer 34 is a sealing disk 35 which seals the interior of the recess in web 30, preventing access of particles of ground material into the bearing, and similarly preventing escape of lubricant into the burr chamber. A disk 36 of greater radial extent than member 35 and having a press fit within a larger annular recess in web 30 additionally provides for preventing passage of ground material into the bearing.

Mounted upon the upper end of the motor shaft is a burr-carrying member 40, suitably fastened to the shaft in driving relationship therewith. A cross pin 41 fitting within a slot in member 40 provides for driving the rotary burr. The member 40 is formed with a central raised portion 42 which is upwardly recessed to receive the end of the motor shaft. The raised part 42 is drilled and tapped to receive an adjusting screw 43 which passes through the member 42 and into supporting relation with the end of the motor shaft. Resilient means 44 serves to place a tension upon screw 43 to prevent its working loose in operation, adjustment of the screw 43 providing for raising or lowering of the burr-carrying member 40 with respect to the motor shaft, and thereby adjusting the zero position of the spacing of the burrs. A rotary burr member 45 is fastened in place upon member 40 by means of countersunk screws 46, providing for readily replacing the burr if required during use. Rotary member 40 is also formed with several radially extending projections 47 which extend closely adjacent the wall of the burr chamber formed by flange 31, and in rotation provide for positively feeding and discharging the ground material from the grinding chamber 32. A similar series of blades 48, preferably three in number, are provided on the lower face of member 40 to sweep out the lower portion of the burr chamber and to avoid collection of the ground material therein.

The upper end of casing 12 is internally threaded as shown at 50 to provide for adjustably and removably receiving the upper member 51 which serves as a feeding hopper and a storage means for holding the material to be ground. This member comprises a lower funnel-shaped portion 52 carrying a threaded portion adapted to cooperate with the portion 50 of the casing 12, and having smooth inwardly and downwardly tapering walls to provide for the feeding of the coffee beans toward the center and into the grinding burrs. Member 52 terminates in an upwardly opening recess 53 having an outer annular flange 54, and adapted to receive the lower end of a cylindrical member 55. An inner band 56 is sprung into position against the base of the part 55 to securely hold the same in assembled relation with member 52 forming a receiving and storing hopper.

The cylindrical part 55 is preferably constructed of a translucent or transparent material, such as a composition cellulose material of non-breaking character, to provide for the viewing of the interior of the contents through the side wall. A removable cover 57 slidingly fits over the top of the hopper, to provide for filling thereof and access as to the interior. It will be understood that if desired, the wall portion 55 may be formed of non-transparent material.

The lower portion of the hopper 52 terminates in a circular opening 60, and fastened to the lower end of the funnel portion by means of screws 61 is the stationary burr 62. In such position it is supported immediately above and in alignment with the rotary burr 45, the raised part 42 and the screw 43 extending partially into the opening 60, to thereby affect the rate at which coffee beans are permitted to flow from the storage hopper into the grinding chamber 32 to be acted upon by the grinding burrs. The hopper assembly is rotatable with respect to the lower casing, to provide for assembly and disassembly of the device, and likewise to secure adjustment in the setting of the mill, to determine the grade to which it will grind. As will be clear, rotation of the hopper assembly with respect to the casing upon the threaded portion 50 will result in raising or lowering of the hopper and the stationary burr 62 with respect to the lower rotating burr 45. This relative spacing between the burrs provides for controlling the fineness of grind, and suitable indexing means 64, in the form of a stationary pointer on the exterior of the casing member 12 is provided for cooperation with a band 65, carried by the adjustable hopper assembly, and carrying suitable designations such as "Vacuum pot," "Drip pot," "Percolator" and "Regular pot." By rotating the hopper assembly to bring the appropriate designation into indexing relation with the marker 64, the operator is thus enabled to adjust the fineness of grind for each operation to accord with the character of coffee desired, and to correspond with the particular method to be used in making the coffee. A series of pins 66 are positioned in enlarged portions of flange 31 and are resiliently urged upwardly by springs 67. The pins are adapted to seat in correspondingly arranged depressions 68 formed in member 52, so that as the storage hopper is rotated upon the base assembly, the pins will successively notch into the depressions, to releasably retain the hopper in any adjusted position during operation. Preferably the number of depressions is several times the number of the designations 65, so that a complete range of intermediate grinds may be secured.

The provision of the resiliently actuated pins or detents 66 provides for taking up slack in the threads 50, and thus provides for maintaining a uniform setting of the mill throughout its operation. As shown, preferably three detents 66 are provided, located symmetrically about the lower casing, which serve to press the storage hopper upwardly in a balanced and uniform manner, the force exerted by the several pins being preferably sufficient to overbalance the weight of the storage hopper. Thus any loose play in the threads is taken up, and there is no tendency for the spacing of the burrs to vary under operation, and a uniform character of fineness of grind is secured.

As the coffee is ground by the rotating burrs, it is discharged from the burr chamber 32, under the action of the feed members 47, through a discharge passage 70 which is preferably arranged non-radially and along a partial tangent to the rotating burr as shown in Fig. 5. With such partial tangential or non-radial relationship of the discharge passage, it is found that proper discharge of the ground material therethrough is facilitated. It is found that there is a certain range of angular positions for any given construction which gives the most satisfactory conditions of discharge with respect to rate of feed, pressure and the like. Also as shown in Figs. 2 and 5, the walls of the discharge passage are so formed that it becomes progressively larger as the coffee proceeds therethrough. This outwardly tapering characteristic thus serves to prevent objectionable packing of the coffee within the passage during discharge, and facilitates rapid and satisfactory flow of the coffee through the passage at all times.

Coffee comprises a heavier bean portion, and a light flaky material coming from a membrane-like structure near the center of the bean and known as chaff. In the course of the grinding operation, the rapidly rotating grinding burrs break up the bean and chaff portions, and likewise tend to set up air currents which have a tendency to blow the chaff away from the bean, and to result in segregation thereof. Also such rapidly moving burrs have the tendency to create electrostatic charge upon the particles of chaff, which further tends to produce segregation of the chaff from the ground particles of bean. Where the discharge from the coffee mill is supplied directly to the receiving container, objectionable segregation of these two materials occurs and the operation may also result in blowing fine particles particularly of chaff entirely out of the container, producing an undesirable condition. Even where the material is entirely received within a container, there is a marked tendency for the heavier particles to fall to the bottom of the container, and for the light particles to collect upon the sides, and to fall onto the container as a mass, producing a product which is non-homogeneous as to its composition and appearance. It is further found desirable to retain a uniform mixture of the chaff with the ground bean because of the desirable effect of the chaff of tending to form a better filter mat and avoiding the creation of channels through the ground bean as the water passes therethrough.

In accordance with the present invention means are provided for discharging a ground mixture of bean and chaff, which will fall properly and without air currents into the receiving container, to be present in such container as a homogeneous mass of ground bean and chaff. For this purpose the walls of the discharge passage 70 are provided with an outwardly extending part 71 to the upper side of which is pivotally fastened a gate member 72 having side flanges 73. Such gate member is arranged to occupy a normal position as shown in Fig. 1, under the action of gravity, where it yieldingly rests against the outer end of the discharge passage 71. Upon operation of the mill, and the feeding of coffee into and through the discharge passage, a pressure is established in the chamber under the action of the feeding members 47, which causes a confining of the ground material, with contact and rubbing of the bean portions with the chaff upon each other and upon the walls of the passage, thereby resulting in substantial dissipation of electrostatic charge on the particles of caff. The degree of such confining pressure is controlled by the weight of the gate member 72, such gate member yieldingly opening under the pressure of the confining material, to a position as illustrated in Fig. 2, to provide for the regulated discharge of ground material from the chamber. Such construction not only serves to overcome and dissipate objectionable electrostatic charge, but it also prevents the blowing of fine particles of ground material out of the discharge passage, and out of the receiving container. The discharge passage being filled with ground material, this objectionable action of air currents is thus entirely avoided.

The base member 10 is provided with a cutout portion 75 at its base, and in alignment with the discharge member 71, to provide for the positioning of a receiving container 76 in position beneath the pivoted gate. Such receiving member preferably comprises a glass, carrying on its side a series of markings 77 which serve as a measure to determine the amount of coffee desired to be ground. Thus it is customary to utilize approximately one tablespoon of coffee for each cup, and the graduations 77 may be conveniently arranged to indicate each tablespoonful of coffee ground, so that the operator may very readily determine the exact quantity of coffee to be ground at each operation. A suitable motor control switch 78 is positioned at a location convenient for use by the operator while observing the quantity of coffee ground.

The present invention thus provides a simple and compact coffee mill structure which is lightweight and portable, and especially adapted for household or domestic use. While the storage hopper 55 may have any desired capacity, it is preferred to so form the device as to receive in excess of the usual order of coffee, so that as each new order is purchased, the coffee in bean form may be placed in the storage hopper, and retained therein until substantially used up, and a new supply then purchased. For example a pound of coffee occupies approximately 76 cubic inches, and in a preferred embodiment of the present invention the capacity of the hopper unit is approximately 97 cubic inches. It is further found that a mill constructed in accordance with the present invention operates rapidly, and will grind the usual quantity required for a coffee-making operation in a brief period of time. Thus for example tests have shown that the mill will provide for the grinding, in the regular pot grind, of a pound of coffee in two minutes, and will grind the same quantity of coffee to a "drip pot" grade of fineness, in approximately three minutes.

The mill thus provides for the purchase of coffee in the usual quantity in bean form, the entire order being placed in the storage hopper of the mill preparatory for use. In such condition, i. e. in bean form, the coffee retains practically in entirety, its essential oils and flavors, so that upon grinding of the quantity required for each coffee-making operation, the ground coffee is always certain to be fresh, and this freshness is found to result in a superior flavor and aroma in the coffee made therefrom.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A coffee mill of the character described adapted for domestic use which comprises a supporting casing, a driving motor mounted substantially vertically in said casing, a burr chamber, a burr carrying member in said burr chamber and mounted on said motor shaft, drive means connecting said burr carrying member to the motor shaft for rotation therewith, said drive means providing for movement of the member axially of the shaft, a grinding burr attached to said burr carrying member, said member having a central raised portion, a storage hopper for receiving coffee to be ground and having a central discharge aperture for feeding coffee to said burr chamber, means on said casing for supporting said storage hopper in position above said burr chamber and with the raised portion of said burr carrying member extending into said aperture to provide for regulated feed of material to be ground into the burr chamber, and means on said raised portion and accessible through said hopper aperture for adjusting the vertical position of said grinding burr and burr carrying member on said motor shaft.

2. A coffee mill of the character described adapted for domestic use which comprises a supporting casing, a driving motor mounted substantially vertically in said casing, a burr chamber, a rotary grinding burr positioned in said burr chamber and mounted on said motor shaft, drive means connecting said grinding burr to the motor shaft for rotation therewith, said drive means providing for movement of the burr axially of the shaft, a stationary burr, and adjusting means accessible from the exterior of said casing for predetermining the axial positioning of said rotating burr upon said motor shaft to adjust the zero setting of said grinding means, said adjusting means including a threaded member cooperatively engaging said rotatable burr and said motor shaft and providing for positively effecting said movement of the rotatable burr axially of said shaft upon rotation of the threaded member.

3. A coffee mill of the character described adapted for domestic use which comprises a supporting casing, a driving motor mounted in said casing, a burr chamber, a rotating burr in said burr chamber mounted on the shaft of said motor and driven by said motor, a storage hopper for receiving coffee to be ground and having a discharge opening, means on said casing for adjustably receiving said hopper adjacent said discharge opening to vary the position thereof with respect to said casing, a stationary burr carried by said hopper, indexing means visible from the exterior of said casing to provide for predetermining the relative positions of said storage hopper and said casing to thereby select a predetermined fineness of grind, and means accessible through said discharge opening of the hopper for varying the position of said rotating burr upon said motor shaft to adjust the spacing between said rotating and stationary burrs in the zero position of said indexing means.

4. A coffee mill of the character described adapted for domestic use which comprises a supporting casing, a driving motor mounted in said casing, a burr chamber, a grinding burr rotatably driven by said motor in said burr chamber, means supporting said rotary burr for movement axially of the shaft of said motor, a storage hopper for receiving coffee to be ground, a stationary burr attached to said hopper and supported in said burr chamber in cooperative relation with said rotary burr, means on said casing for threadedly and adjustably receiving said hopper, rotation of said hopper with respect to said casing providing for varying the spacing of said burrs, indexing means fixed respectively to said casing and hopper and visible upon the exterior of said casing for selecting a predetermined relative positioning of said hopper and said casing to select a predetermined grade of fineness of grind, and rotatable means accessible from the exterior of said casing and cooperating with said motor shaft and said rotary burr for positively effecting said movement of the rotary burr axially of said shaft upon rotation of said rotary means to provide for adjusting the zero setting of said indexing means.

5. A coffee mill of the character described adapted for domestic use which comprises a supporting casing, a driving motor mounted in said casing, a burr chamber, a grinding burr rotatably driven by said motor in said burr chamber, a storage hopper for receiving coffee to be ground, a stationary burr attached to said hopper and supported in said burr chamber in cooperative relation with said rotary burr, means on said casing for threadedly and adjustably receiving said hopper, said hopper being manually rotatable with respect to said casing for varying the spacing of said burrs, and means coacting with said casing and said hopper for taking up slack in said threaded means to maintain uniform predetermined spacing of said burrs during operation and providing for yieldably retaining said hopper and said casing in any of a series of relative positionings, said last named means including relatively movable parts carried respectively by said casing and said hopper and yieldably urged into cooperating relation with each other.

6. A coffee mill of the character described adapted for domestic use which comprises a supporting casing, a driving motor mounted in said casing, a burr chamber, a grinding burr rotatably driven by said motor in said burr chamber, a storage hopper for receiving coffee to be ground, a stationary burr attached to said hopper and supported in said burr chamber in cooperative relation with said rotary burr, means on said casing for threadedly and adjustably receiving said hopper, rotation of said hopper with respect to said casing providing for varying the spacing of said burrs, and detent means positioned within said casing and yieldably engaging a series of depressions formed in said hopper, said detent means serving to take up slack in said threaded means to maintain uniform predetermined spacing of said burrs during operation and providing for yieldably retaining said mill in any predetermined position of adjustment.

7. A coffee mill of the character described adapted for domestic use which comprises a base, a housing mounted thereon and extending upwardly in generally cylindrical relationship, a driving motor mounted substantially vertically in said housing, a burr chamber formed in said housing above said motor, grinding burrs in said chamber, one of said burrs being driven by said motor, a storage hopper positioned above said casing, said storage hopper having a downwardly sloping funnel portion to supply coffee into said burr chamber to be ground by said burrs, said funnel portion having a shoulder recess at the upper end thereof, a transparent substantially cylindrical side wall portion seated in said recess and providing for viewing the quantity of coffee contained in said storage hopper, a band of spring material engaging said transparent side wall adjacent said recess to maintain the side wall portion in said seat and an upper removable cap, fitting over the upper end of said transparent side wall and providing access to the interior of said storage hopper.

8. A coffee mill of the character described adapted for domestic use which comprises a supporting casing having inlet and discharge openings, a driving motor mounted in said casing, a burr chamber, a rotary grinding burr positioned in said burr chamber and mounted on said motor shaft, a stationary burr, and adjusting means for predetermining the position of said rotating burr upon said motor shaft to adjust the zero setting of said grinding means, said adjusting means comprising a burr carrying member having a central recess adapted to receive the end of said motor shaft, means providing a driving connection between said burr carrying member and said motor shaft, said drive means providing for movement of said burr carrying member axially of said shaft, and means accessible through the inlet opening of said casing and cooperating with said burr carrying member and said shaft to adjust the axial positioning of said burr on said shaft.

9. A coffee mill of the character described which comprises a hopper for receiving and storing a quantity of coffee to be ground, said hopper having a funnel at its lower end, a casing, a burr chamber formed in said casing, a motor mounted in said casing, thread means on said casing and said hopper for adjustably supporting said hopper on said casing with said funnel extending directly into said burr chamber, a stationary burr carried on the lower end of said funnel, a rotary burr driven by said motor mounted in predetermined relative positioning within said burr chamber and in close juxtaposition to said stationary burr throughout a range of grinding positions of said stationary burr to prevent passage of material from said hopper through said burr chamber during periods of non-operation, said hopper and said stationary burr being engageable upon and continuously adjustable with respect to said casing and said rotary burr respectively by direct manual rotation of the hopper upon said thread means to thereby vary the spacing between said burrs to adjust the fineness of grind to a predetermined grade of fineness corresponding to each relative position of said hopper and said casing, and additional means effective between said casing and said hopper to yieldably retain said parts in predetermined relative adjusted positions throughout the operative range of grinding adjustment while providing for said manual grade selecting adjustments.

10. In a coffee mill of the character described which comprises a casing, a motor mounted in said casing, a burr chamber in said casing, a rotary burr driven by said motor in said burr chamber, a hopper for receiving and storing a quantity of coffee to be ground, a stationary burr carried by said hopper in cooperative relation with said rotary burr, said hopper being threadedly mounted upon said casing and continuously adjustable with respect thereto over a grade selecting portion of its range of threaded movement for producing a predetermined spacing between said stationary and said rotary burrs and a corresponding variation in the fineness of grind, and additional means cooperating with said hopper and said casing and operative in said grade selecting portion of the range of threaded movement of the hopper for yieldably retaining said parts in predetermined relative adjusted positions during the grinding operation while providing for direct manual rotation of said hopper to adjust the fineness of grind.

11. A coffee mill of the character described adapted for domestic use which comprises a supporting casing including a base member, a substantially cylindrical housing mounted on said base member, said base member being provided with a shoulder portion extending interiorly of said housing, said housing being provided with a shoulder extending inwardly from the housing and spaced above said shoulder portion of the base member, a driving motor received within said housing and having a stator mounted in assembled relation between said inwardly extending shoulder portion of the base member and said inwardly extending shoulder of the housing and completely enclosed by said housing, a web formed in said base member, a thrust bearing positioned in said web for rotatably supporting the lower end of a shaft carrying the rotor of said motor, a web formed in said housing above said base, a bearing for the upper end of said motor shaft positioned in said last mentioned web, fastening means accessible at the bottom of said base and extending upwardly through said shoulder portion of the base member and said stator and engaging the inwardly extending shoulder of said housing to secure the housing to the base member with said stator clamped between said shoulders and with said motor supported in said bearings, said housing enclosing a burr chamber above said upper web, and a storage hopper for supplying coffee to said burr chamber removably attached to the upper end of said housing.

12. A coffee mill of the character described adapted for domestic use which comprises a supporting casing, a driving motor mounted substantially vertically in said casing, a burr chamber formed in said casing above said motor, a grinding burr rotatably driven by said motor in said burr chamber, a storage hopper positioned above said burr chamber for receiving coffee to be ground, means on said casing for threadedly and adjustably receiving said hopper, a stationary burr carried by said hopper and adjustable with respect to said rotary burr upon manual rotation of the hopper in said thread means to vary the fineness of grind, said hopper comprising a downwardly sloping funnel portion for supplying coffee into said burr chamber having an upwardly opening neck portion, member mounted on said funnel portion forming the main side wall portion for said hopper and providing for visibility of the quantity of coffee within the hopper from any viewing position and throughout the range of adjustable positionings of the hopper upon the casing, means cooperating with the lower end of said main side wall portion and with said neck portion for removably securing the side wall portion to the upper end of said funnel portion, and additional means effective between said hopper and said casing for yieldably retaining said parts in predetermined relative adjusted positions during the grinding operation while providing for direct manual rotation of said hopper to adjust the fineness of grind.

DAVID A. MEEKER.
F. DOUGLASS HOUSER.